J. S. BANCROFT & M. C. INDAHL.
KEYBOARD MECHANISM FOR PERFORATING AND OTHER MACHINES.
APPLICATION FILED MAY 13, 1913.

1,094,629.

Patented Apr. 28, 1914.

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

KEYBOARD MECHANISM FOR PERFORATING AND OTHER MACHINES.

1,094,629.      Specification of Letters Patent.     Patented Apr. 28, 1914.

Application filed May 13, 1913. Serial No. 767,460.

*To all whom it may concern:*

Be it known that we, JOHN SELLERS BANCROFT and MAURITZ C. INDAHL, citizens of the United States, residing at Philadelphia, in the county of Philadelphia and State of Pennsylvania, have invented certain new and useful Improvements in Keyboard Mechanism for Perforating and other Machines; and we do hereby declare the following to be a full, clear, and exact description of the same, reference being had to the accompanying drawings, forming part of this specification, and to the figures and letters of reference marked thereon.
This invention has relation to actuating mechanism for key controlled machines, and is specially designed for application to the class of keyboard perforating machines commonly employed for producing or composing the controllers, patterns or record strips for automatic mechanisms, such as type casting and composing machines, and it has for its principal objects to increase the speed capacity and to render more certain and uniform the key action through which the performing members or punches are selected and brought into action.

To these ends the invention consists in the construction, combination and arrangement of parts hereinafter fully described, the novel features whereof are specified and pointed out in the appended claims.

In the accompanying drawings, illustrating a preferred form of embodiment of the invention,
Fig. 8 is a transverse vertical section on the line y—y, Fig. 4.

The same numerals designate like parts in the several views.

For the purposes of illustration the invention is shown in connection with and as applied to the record strip composing machine of Patent No. 944,405, dated Dec. 28, 1909. In the machine of said patent each key is coupled with a performing member or key bar, which latter, through a permutation mechanism, is connected with any one or more of a series of valve bars each controlling the motion of a corresponding punch. Ordinarily but one or two punches are thus placed under the control of a single key; but under certain conditions it becomes necessary to operate a larger number of punches from a single key, as, for example, in preparing a record strip for the machine of Patent No. 782,536, dated February 14, 1905, where each signal includes from one to eight and possibly more perforations.

According to the present invention the power for actuating the key bars is transferred from the keys to a single-stroke motor, and the keys serve merely to effect the release of individual actuating devices or members for coupling the selected key bar and motor, and for inaugurating the movement of the latter.

Figure 1:
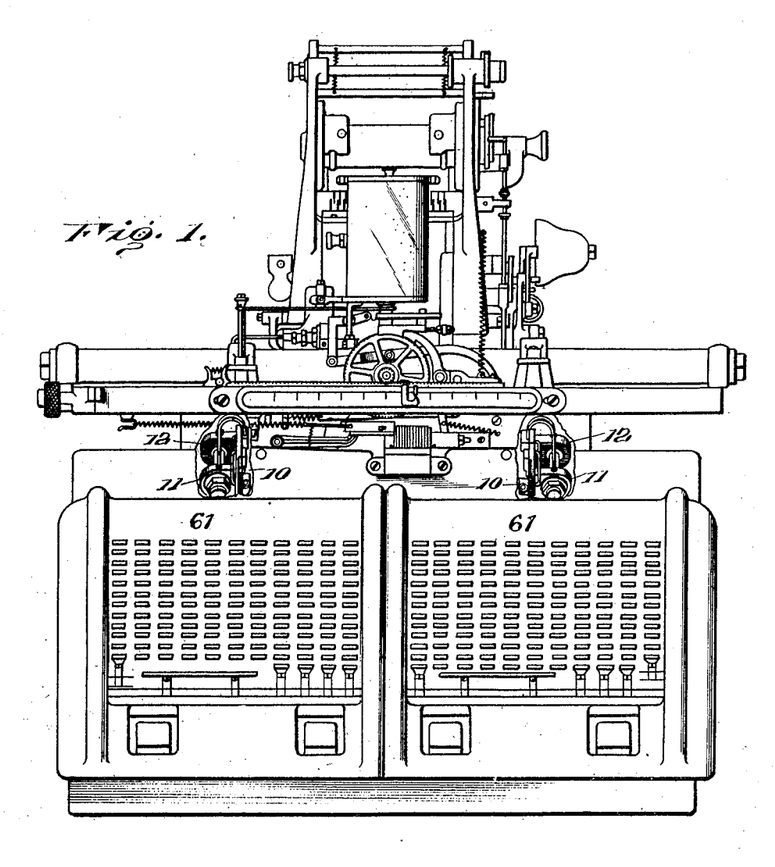
Figure 1 is a front elevation of the machine.
Figure 2:
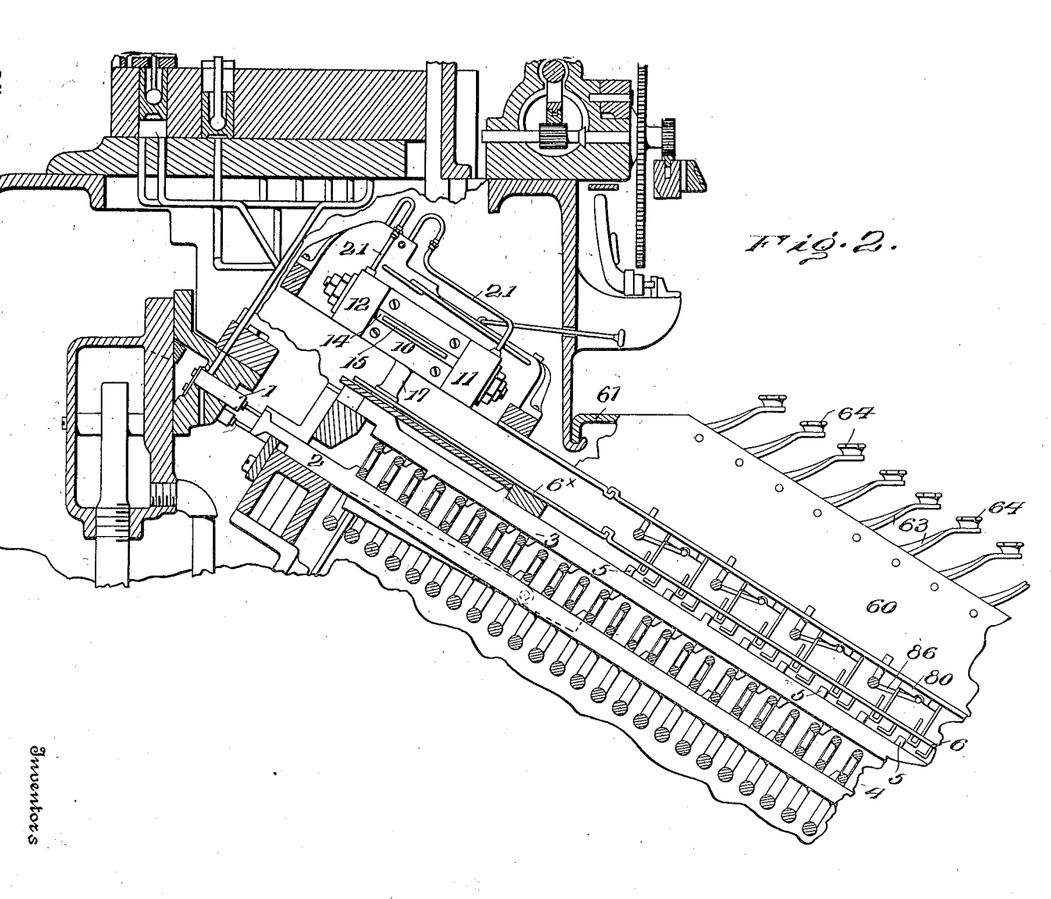
Fig. 2 is a partial sectional view showing the motor, driver and connections with the key bank.

In the machine of Patent No. 944,405 each of the series of punches is represented by a controlling valve 1, Fig. 2, each valve by an actuating bar 2, and each key by a key bar 3. Interposed between the key bars and valve actuators is a permutation or transmitting mechanism 4 through which any key bar may be coupled with any one or more of the valve actuators 2, as fully explained in said prior patent. The present improvements relate to the means for actuating said selective key bars or performing members 3, each of which is provided with a lug or projection 5 for this purpose.

It may here be observed that for convenience the machine of the patent referred to has its key bank constructed in two separately removable sections, and the same plan is here adopted, the new motor mechanism being duplicated for the two sections; and as the motors are identical and the key actions duplicates, a specific description of one motor and of one key mechanism will suffice for all.

Supported to reciprocate in parallel with the series of key bars 3 of each section is a driver in the form of a plate 6 provided with a perforation 7 and an engaging shoulder 8, immediately in rear of each key bar lug 5. Conveniently these openings and engaging shoulders are produced by forming angular cuts in the plate and bending the inclosed material laterally and forward to form L-shaped extensions below the plane of the plate, the horizontal members of said projections lying opposite but normally removed from the complemental key-bar lug 5. Plate 6 constitutes the driver for the several key-bars associated therewith and is detachably coupled to the single stroke motor about to be described.

The motor is supported upon a frame or housing 10 and is provided with opposed cylinders 11, 12 in which work pistons 13, the latter coupled together by a connecting rod 14. This connecting rod is slotted to receive the arm 15 of a slide 16, the latter supported to reciprocate in guides in frame 10 and provided with an arm 17 through which connection is made with driver 6, to the end that said driver may be compelled to participate in the longitudinal movements of the piston rod. Although for structural purposes formed separate therefrom, slide 16 is in effect a part of the driver 6 with which it is connected through a separable coupling 6×.

Figure 4:
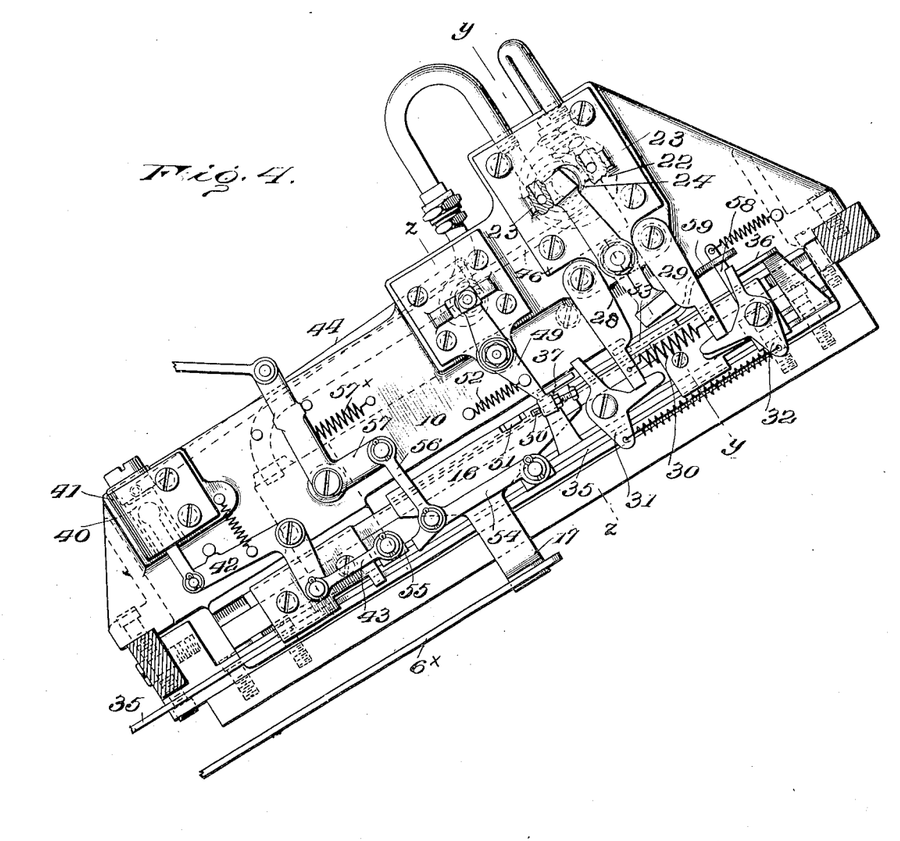
Fig. 4 is a side elevation of the motor.
Figure 5:
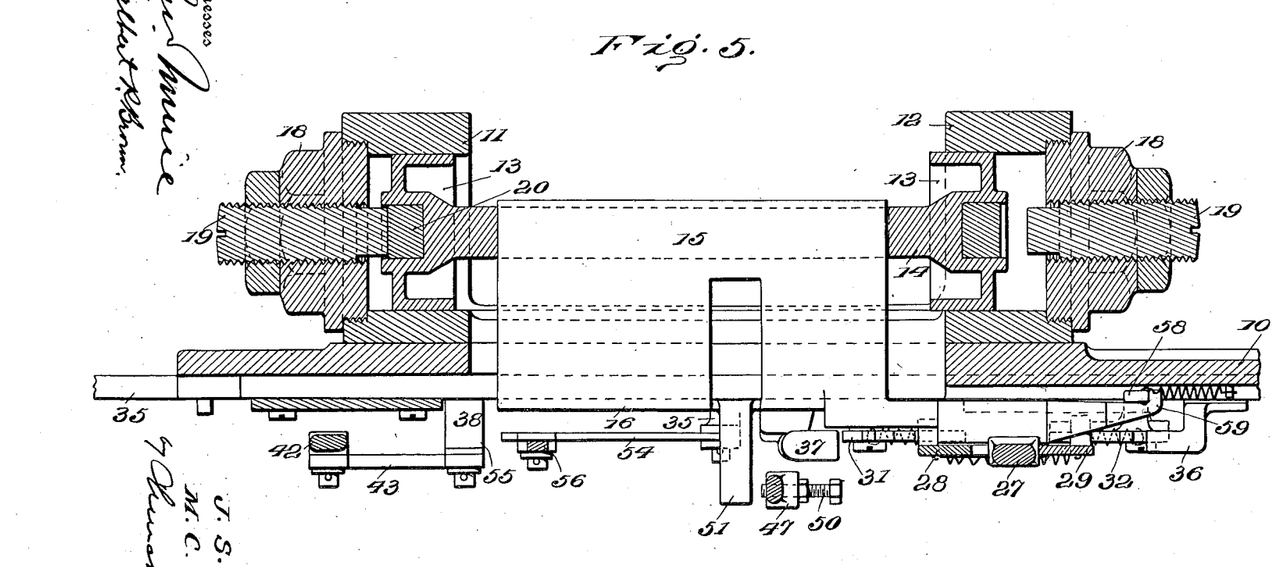
Fig. 5 is a longitudinal sectional view of a portion of the motor mechanism.
Figure 6:
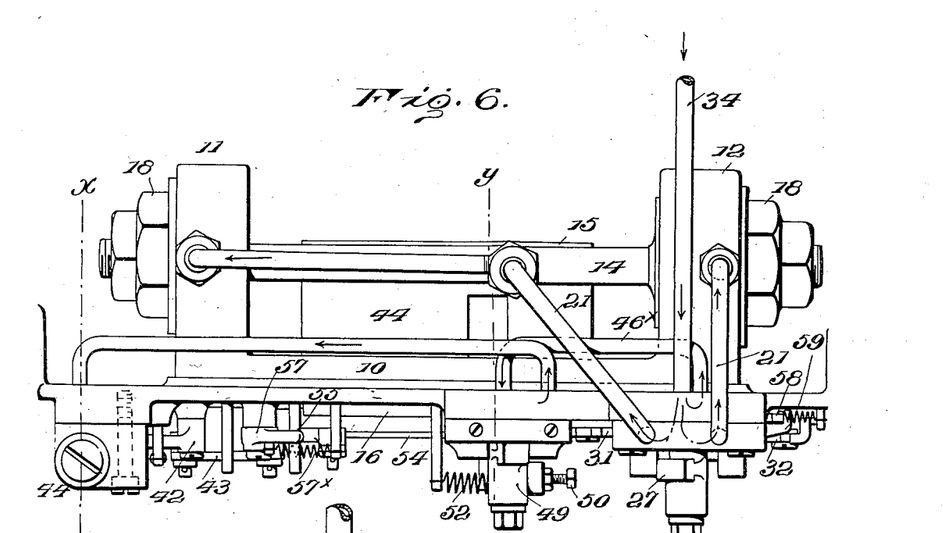
Fig. 6 is a top plan view of the motor mechanism.
Figure 9:
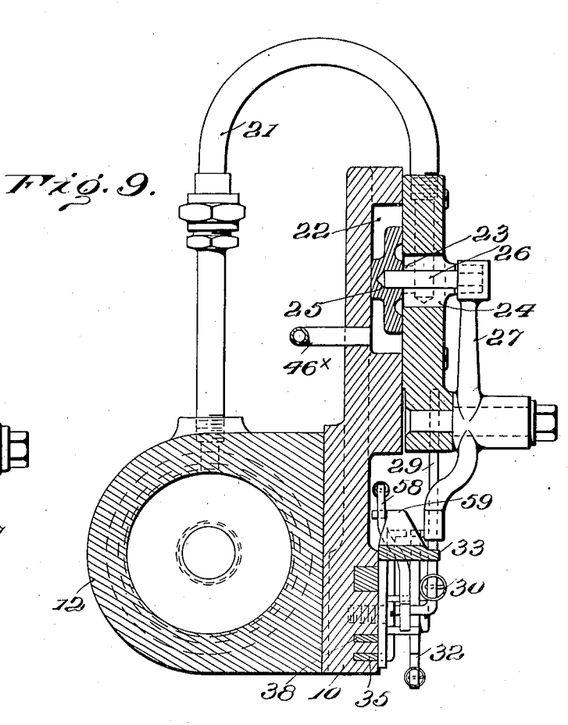
Fig. 9 is a transverse vertical section on the line z—z, Fig. 4.

The outer ends of cylinders 11, 12 are closed by removable heads 18, Fig. 5, each carrying an adjustable member 19 in position to engage a plug 20 of cork or other suitable material located within a recess in piston 13, to provide a sound deadening cushion. Cylinders 11, 12 are furnished with ducts 21 terminating within a valve chamber 22 in ports 23, Figs. 4 and 9, located on opposite sides of an exhaust port 24. A slide valve 25, located within chamber 22 is arranged to alternately uncover one port 23 and connect the other port 23 with the exhaust. The stem 26 of slide valve 25 passes through exhaust port 24 and is connected to one arm of a lever 27, the other arm whereof is projected between two actuators in the form of pivoted levers 28, 29, the latter connected by a spring 30. Pivotally supported upon the frame are two latches 31, 32, in position to engage and retain levers 28, 29 in retracted position with spring 30 under tension. Slide 16 carries a lug 33 projected between levers 28, 29, in position to engage one or the other of the latter at opposite ends of its stroke, for the purpose of retracting said levers and effecting their reëngagement with the retaining latches.

Figure 3:
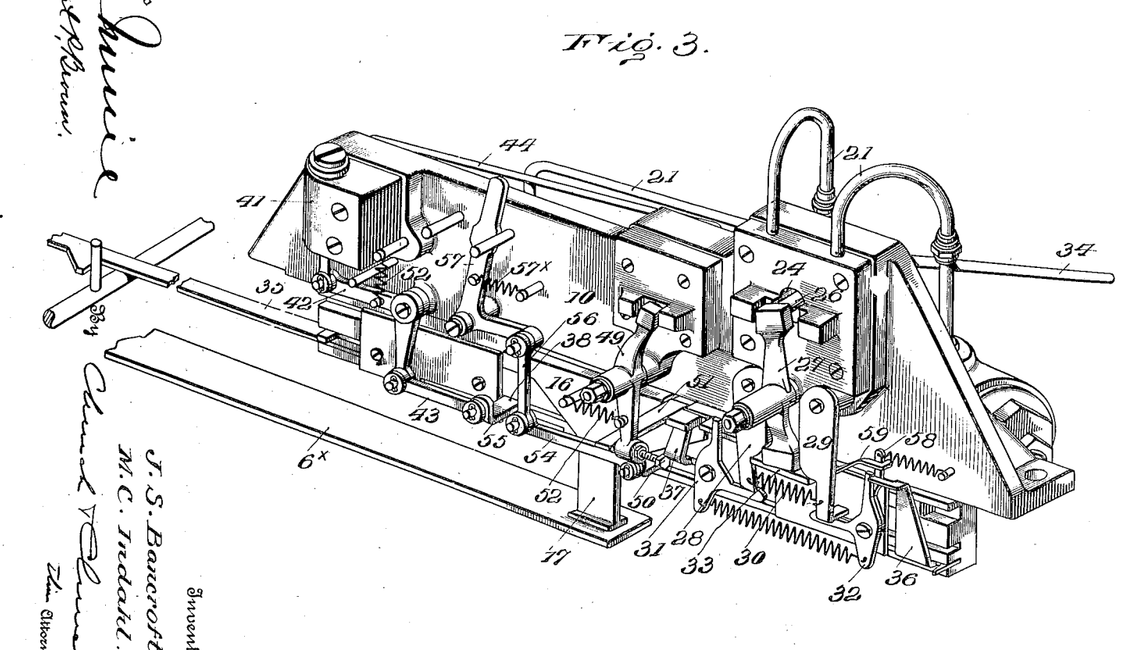
Fig. 3 is a perspective view of the motor.

A pressure supply pipe 34 communicates with the interior of valve chamber 22, and in its normal or inactive condition the motor, as thus far described, is brought to rest with valve 25 at the end of its stroke uncovering port 23 leading to cylinder 12 and connecting port 23 of cylinder 11 with the exhaust, as illustrated in Fig. 4. Both levers 28, 29 are now held in retracted positions by their latches 31, 32, valve 25 is retained in positions by the pressure within chamber 22, and driver 6 is held retracted as in Figs. 2, 3 and 4 by the pressure in cylinder 12.

It is obvious that if latches 32, 31 are actuated in succession to alternately release valve actuating levers 29, 28, the motor will be energized to reciprocate driver 6, the withdrawal of latch 32 causing lever 29 to engage and shift valve 25, thereby connecting cylinder 12 with the exhaust and admitting pressure to cylinder 11 whereby driver 6 is advanced to reëngage the lever 29 with its latch 32. If now latch 31 be moved to release lever 28, valve 25 will be moved to the opposite extreme of its stroke renewing pressure in cylinder 12 and exhausting from cylinder 11, the resulting retrograde movement of driver 6 restoring valve actuator 28 to its latch and at the same time placing motor spring 30 under tension. It is apparent, therefore, that both the time and direction of motion of the motor and connected driver can be controlled through the agency of latches 31, 32. It is required, according to the present invention, that the motor should be adapted for both continuous and single action, the former when it is desired to automatically repeat a given signal, as in quadding out a line, and the latter for producing a single signal in response to the depression of any key. The mechanism through which these two actions are attained will next be described.

Figure 7:
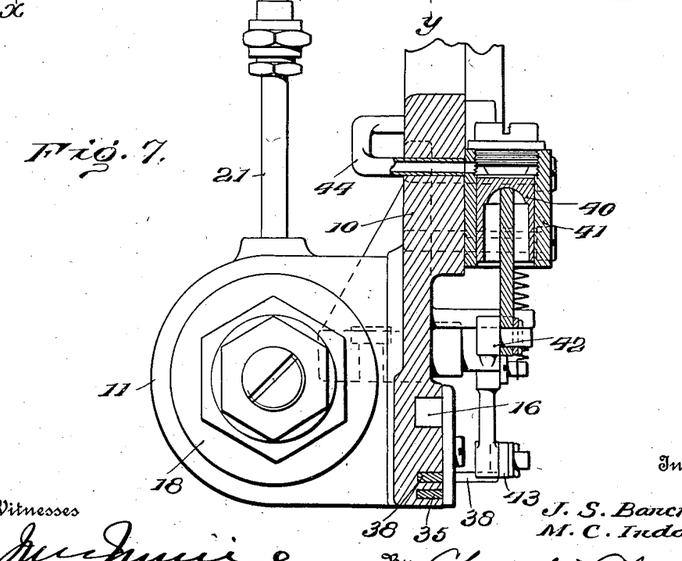
Fig. 7 is a vertical section on the line x—x, Fig. 6.
Figure 8:
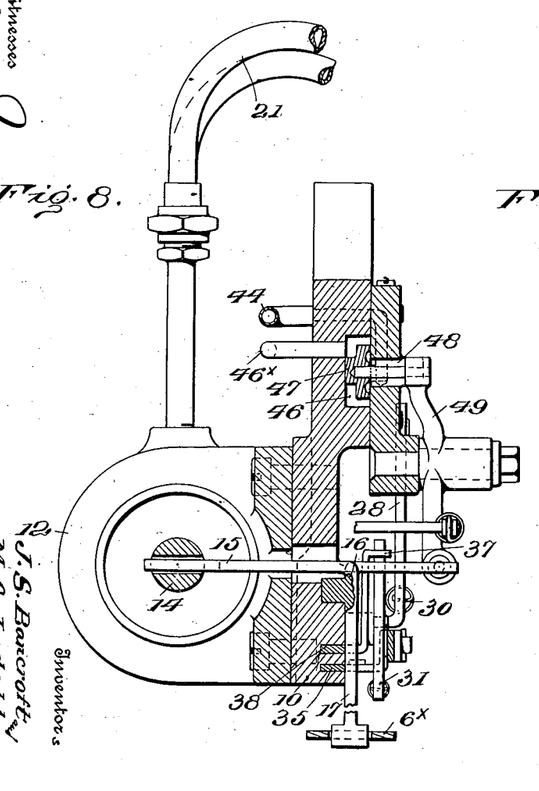
Figures 10, 11:
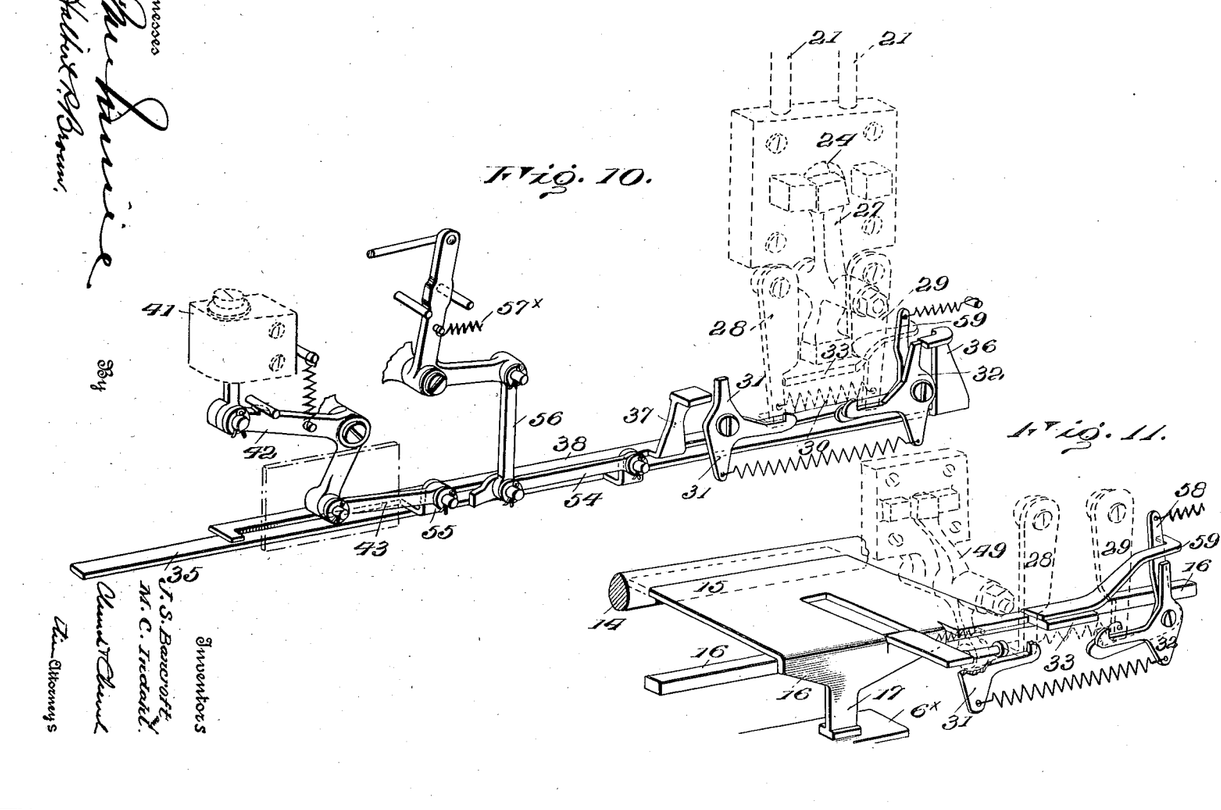
Fig. 10 is a perspective view of the motor controlling connections.
Fig. 11 is a similar view of the tripping connection for the reversing valve.

Mounted to reciprocate longitudinally in guides in frame 10 is a bar or slide 35, Figs. 3, 4 and 10, provided with an arm 36 in position to engage the tail of latch 32, and a similar arm 37 carried by a slide 38 is located in position to engage latch 31. Slide 35 is the medium through which motion is transmitted from each key to start the motor in action for its forward or operative stroke, while slide 38 controls the return stroke and for that purpose is coupled with an auxiliary motor, the latter represented by a piston 40, Fig. 7, working in a cylinder 41 and having its piston rod connected to one arm of a lever 42 whose other arm is connected through link 43 with said slide 38. One end of cylinder 41 is connected by a conduit 44 with a port 45 in valve chest 46, Fig. 8, the latter containing a valve 47 adapted to alternately uncover said port 45 for the admission of pressure from within said chamber, and to cover said port and connect it with an exhaust port 48. Valve 47 is connected to one arm of a lever 49 whose other arm carries an adjustable contact in the shape of adjustable screw 50 in line with an abutment 51 carried by main slide 16. A retracting spring 52 connected with lever 49 serves to hold the valve 47 normally at one end of its stroke with port 45 in communication with exhaust port 48, and a spring 53 applied to lever 42 serves to retract piston 40 and thereby retain arm 37 of slide 38 in line with but removed from latch 31. Pressure is transmitted to valve chamber 46 through a pipe 46$^x$ in open communication with valve chamber 22. Pivotally attached to slide or starter 35 is a bar 54 whose free end lies in the plane of movement of an abutment 55 on slide 38, said bar 54 serving as a removable interponent through which the impressed movement of slide 38 for engaging trip 31 may be transmitted to slide 35 in a direction to release and prevent engagement with latch 32. The movement thus communicated to slide 35 is a positive one derived indirectly from the prime motor 11, 12 through the auxiliary motor and is in the opposite direction from that required for engaging and operating latch 32. The interponent or bar 54 is coupled by a link 56 with a lever 57 and is held normally in operative relation to abutment 55 by a spring 57$^x$, but can be moved out of operative position by pressure applied to lever 57. A second spring-actuated engaging latch 58, Figs. 3, 4, 10 and 11 is mounted on the frame in position to normally engage valve actuating lever 29, and main slide 16 carries an arm 59 in position to engage and retract this latch 58 and hold it removed from lever 29 when said main slide reaches the extremity of its motion to the left, in Figs. 3 and 4; that is when pressure is exerted in cylinder 12 of the main motor.

The sequence of operations performed by the motor and its controlling devices is briefly as follows: Assuming interponent 54 to be in normal position, slide 35 retracted to the right and slide 38 to the left, Fig. 2, and to the right in Figs. 3 and 4, valve 25 shifted to admit pressure to cylinder 12, latches 31, 32 engaging valve actuating levers 28, 29, and valve 47 retracted to open the exhaust to the auxiliary motor and the latter retracted. Under these conditions the motor spring of levers 28, 29 will be under tension. Main slide 16 with the attached driver 6 will be held at the end of its stroke by pressure in cylinder 12 and arm 59 will be held in engagement with latch 58 sustaining the latter out of the path of lever 29. If now slide 35 is moved in a direction to cause the engagement of its arm 36 with latch 32 the withdrawal of the latter will free lever 29 to shift valve 25 and admit pressure into cylinder 11 while opening the exhaust to cylinder 12. Main slide 16 will thereupon advance until it encounters lever 49 and shifts valve 47, thereby admitting pressure to the auxiliary motor whose piston now acts to advance slide 38, retract slide 35 and at the same time engage latch 31, thus freeing lever 28 and reversing valve 25 so as to effect a return of slide 16 to first position. During the first or operative stroke of slide 16 lever 29 is reëngaged with its latch 32 and during the return stroke of said slide lever 28 is engaged with its latch and valve 47 is shifted by its spring to exhaust the auxiliary motor. This completes the cycle of operation inaugurated by the movement of slide 35, the motor remaining at rest until said slide is again moved to disengage latch 32. The enforced return of slide 35 through interponent 54 prevents the release of latch 32 upon the return movement of main slide 16 under pressure in cylinder 12, and insures a complete stroke of the motor for each impressed movement of slide 35. If, however, interponent 54 be withdrawn as through pressure applied to lever 57, and slide 35 be held in its retracted position while in engagement with latch 32, the motor will be converted from a single stroke into a multiple or continuously reciprocating motor, for in such event supplemental latch 58 will receive and retain lever 29 at the end of the forward or operative stroke of the motor and will be operated upon by arm 59 to automatically release lever 29 and reverse valve 25 at the end of the return or inoperative stroke of the motor, an operation which could not take place had slide 35 been returned to permit a reëngagement of latch 32.

So long as slide 35 is held in its advanced position and interponent 54 is withdrawn from engagement with slide 38 the motor will continue in motion, automatically reproducing the signal corresponding with the key at the time controlling said slide 35; but this action will cease when pressure is relieved upon lever 57 permitting the return of interponent 54 into the path of slide 38, for in such event during the return stroke of slide 16 an enforced withdrawal of slide 35 will be effected and the action suspended by the return of latch 32 into engagement with lever 29. The significance and importance of this dual capacity of the motor will more fully appear in connection with the description of the key action.

For convenience of manufacture each key bank section has its keys arranged in parallel columns, the latter contained in separate frames or housings composed of side plates 60 separated at uniform intervals by cross plates. The several housings are mounted side by side in and detachably secured either to the frame or to the removable cover plates 61 of the respective key-bank sections.

Each key 63 is in the form of a bell crank lever, (preferably stamped from sheet metal), one arm whereof is provided with the usual button or finger piece 64 and the other with two projecting members or teeth 65, 66, the whole being pivotally supported in the side plates of the housing above one of the cross plates 62. Each cross plate is formed with upper and lower sections 67, 68 located in different vertical planes, and connected by a horizontal intermediate section 69, the lower edge of said plate being bent outward to form a flange 70, and the central portion at the junction of the lower and intermediate sections slotted and formed with a turned up section furnishing a retaining shoulder 71, Fig. 17. The upper and shorter projection 65 of the key lies above this retaining shoulder 71 while the lower and more prominent projection 66 lies below said shoulder and extends through the slot in the cross plate. Between each key and its complemental key-bar and under the control of the former is an interponent 75 adapted to be entered between the shoulder 8 of the plate or driver 6 and the key-bar lug 5 through which the motion of the former in one direction, i. e., the active or operative stroke of the motor, is transmitted to the key-bar.

The interponent is furnished with a stem or shank 76 and is provided with a motor spring 77, tending to project said interponent member between the driver and key bar, and it is also furnished with two engaging teeth or shoulders 78, 79, the upper of which is adapted to engage retaining shoulder 71 on the cross plate, when the interponent is fully retracted, as hereinafter explained, and the lower (79) to engage projecting member 66 of the key and be suspended thereon when said key is fully retracted.

Figures 17, 18:
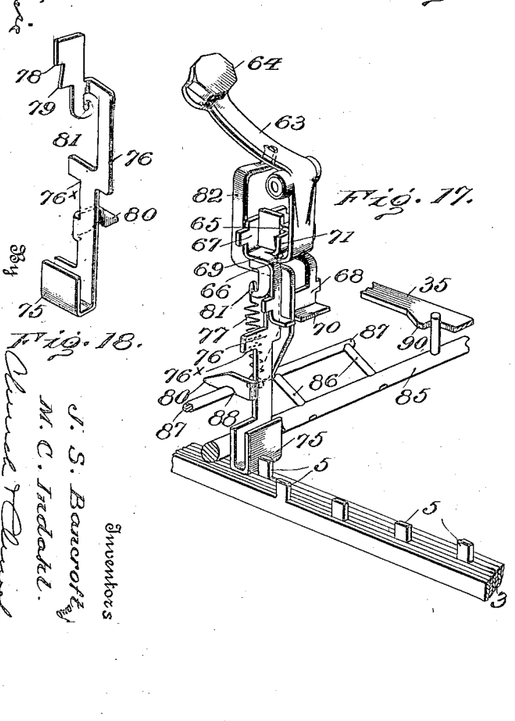
Fig. 17 is a perspective view of the key action, the housing being omitted.
Fig. 18 is a perspective view of one of the interponent members.

Preferably the interponents and their stems are formed from sheet metal cut and bent as indicated in Fig. 18 to provide a relatively wide U-shaped lower section constituting the interponent proper (75), and a narrower flat stem portion located at or near one edge of the interponent, and provided with an intermediate shoulder portion 80 formed by bending a portion of the metal at right angles to the plane of the stem. A portion of the upper end of the flat stem is also bent at right angles to the plane of the stem, one edge of said bent portion being notched to furnish engaging teeth or shoulders 78, 79 of which the last named is the deeper. A hook 81 is also provided near the upper end of the stem for receiving one end of the motor spring 77. The upper end of stem 76 passes through and is guided in a slot in the intermediate section 69 of the cross plate.

The lower end of spring 77 is attached to a strut 82 movable longitudinally in guides in the cross plate and pivotally connected at its upper end to the key at a point intermediate its fulcrum and finger piece. The stem is also provided with shoulders $76^x$ in position to engage guides $77^x$ on the housing for limiting the forward or downward movement of the interponent.

Figure 15:
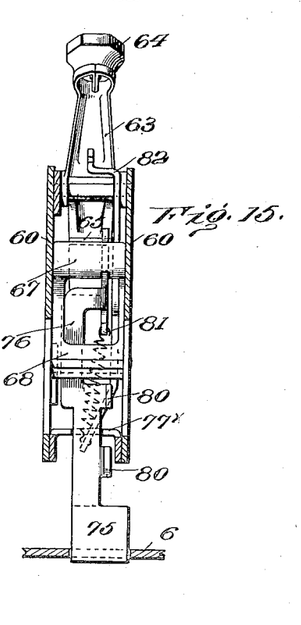
Fig. 15 is a rear elevation, and Fig. 16 a front elevation of one of the keys and its interponent connections.
Figure 16:
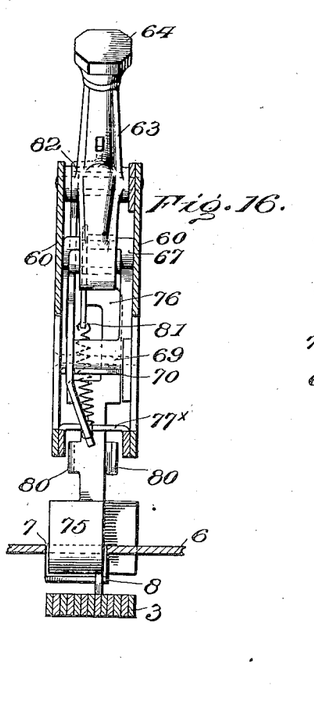

In order that the keys of a column may be brought closely together without interference the stems 76 of adjacent keys are located at opposite edges of the interponents 75; that is to say, two forms are employed, one in which the interponent member is extended laterally to one side and the other to the opposite side of its stem and in which the intermediate shouldered portion 80 projects from relatively opposite faces of the stems as seen in Figs. 15 and 16, respectively. This construction renders possible the employment of duplicate interponents of the two forms mentioned for equipping a column of keys designed to control a plurality of key bars arranged side by side, and, also, permits the shouldered portions 80 of contiguous interponents to be arranged side by side for action upon a member common to the two.

Supported in bearings on the frame is a series of rock shafts 85 each provided with arms 86 carrying a rod 87, the latter extending transversely of the housings 60 beneath the latter. The shouldered portions 80 of the several interponents are provided on their under sides with recessed portions or angular notches 88 for the reception of the rods 87. Each rock shaft 85 is furnished with an arm 89 in position to engage a shoulder 90 on the controlling slide 35 of the motor mechanism.

Figures 12, 13:
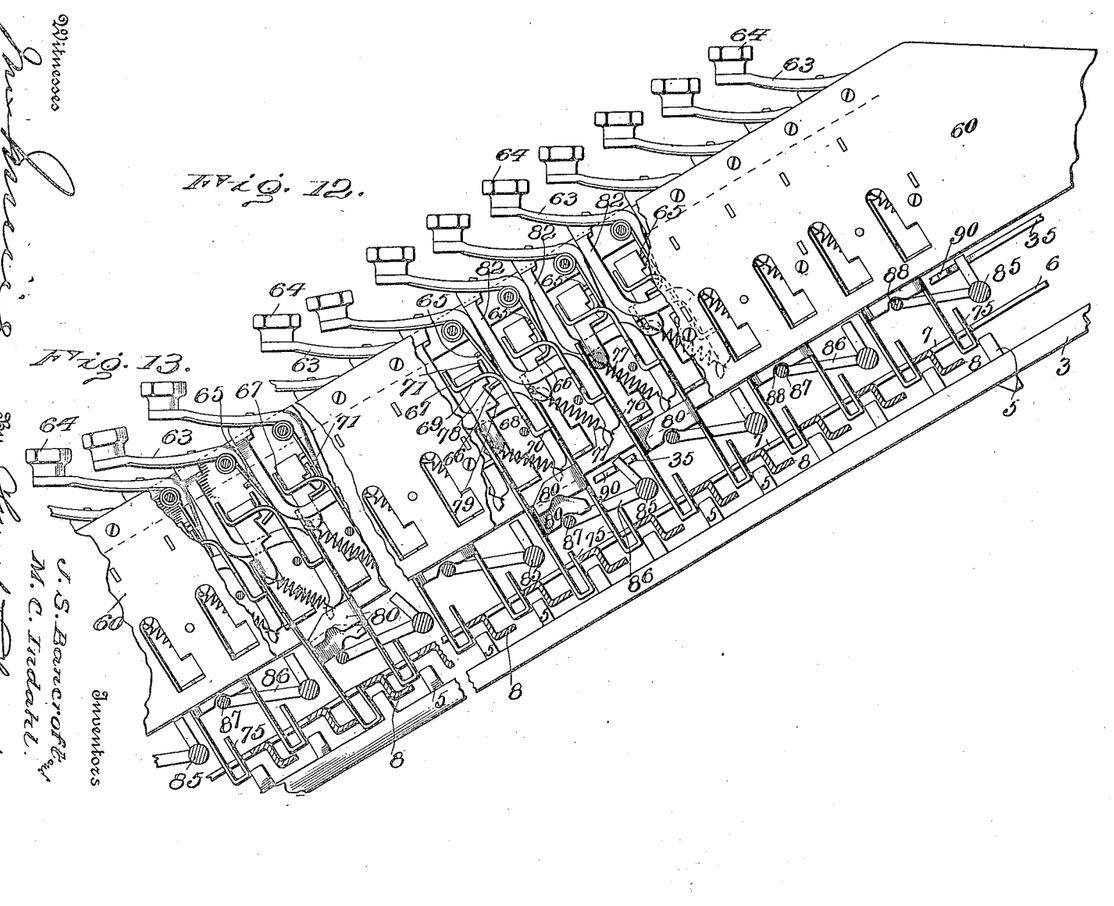
Fig. 12 is a side elevation partly in section of one of the key sections.
Fig. 13 is a detail of the key action showing one of the interponents released and advanced to actuate its key bar.
Figure 14:
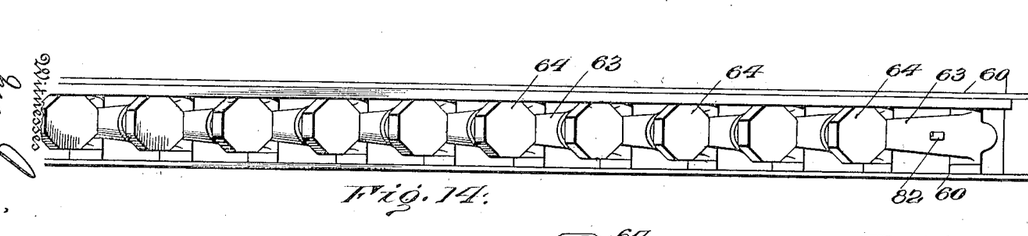
Fig. 14 is a top plan view of one of the key sections.

By associating in pairs interponents possessing reversed shouldered portions 80 the number of rock shafts 85 may be reduced to one half the number of keys in any column containing an even number or one more than half in an odd number column. The action of the key mechanism described and its correlation to the motor is briefly as follows: When in normal or operative position each interponent 75 is held suspended upon tooth 79 of its key lever and in engagement with lug 5 of its key bar 3, and out of range of the complemental engaging shoulder 8 of plate 6, with its motor spring 77 under tension and operating to maintain the stem of the interponent and key lever in contact, and with the recessed or notched section 88 of shouldered portion 80 in register with one of the motor starting rods 87. Slide 35 occupies its retracted position and the motor is at rest holding driver 6 retracted. If, now, pressure is applied to any key in a direction to effect the withdrawal of its supporting tooth 66 from beneath tooth 79, the associated interponent will, under the pressure of its motor 77, be forcibly projected in front of the associated shoulder 8 of driver 6, and at the same time pressure will be exerted by said interponent upon the associated rod 87 to turn its shaft 85 in a direction to advance slide 35. As a result of this action the motor is started to advance driver 6, and the motion of the latter being transmitted through the engaged interponent to the key-bar corresponding with the key brings into action the punch or punches coupled with said key-bar and necessary to produce the desired signal. During this movement of the driver the interponent is carried forward and its shouldered portion is advanced sufficiently to move the recess or notch 88 beyond the rod 87, as indicated in Fig. 13. Upon the completion of the forward stroke of the motor and during the enforced return of slide 35 the operated shaft 85 will be turned in the reverse direction, thereby effecting the withdrawal of the interponent from the path of the driver, and, owing to the displacement of notch 88 and the engagement of the more prominent section of shouldered portion 80 the interponent will be elevated sufficiently to insure tooth 78 passing shoulder 71. If the key has in the meantime been released and returned to normal position this movement will effect the reëngagement of teeth 66 and 79, tooth 65 standing in line with or slightly projecting beyond shoulder 71 preventing the engagement of tooth 78 with said shoulder; but such prompt return of the key seldom occurs owing to the great rapidity at which the motor works in performing its stroke, and it is obvious that unless some means are provided for retaining the interponent in the retracted position to which it is brought by bar 35, said interponent will immediately reëngage and the signal be repeated. It is for this purpose the auxiliary tooth 78 and retaining shoulder 71 are provided.

When the key lever is sufficiently depressed to remove its engaging teeth 65, 66 from the path of teeth 78, 79, of the interponent the pull of spring 77 as the interponent is retracted or forced upward will tilt the upper end of its stem and effect the engagement of tooth 78 with shoulder 71, thus locking the interponent out of action where it remains until, upon the return of the key lever, the upper tooth or projection 65 engages the stem to displace the latter and withdraw its tooth from the supporting shoulder 71. When this takes place, as it does upon the return of the key lever, tooth 66 will have advanced sufficiently to engage tooth 79 of the interponent, thereby restoring the mechanism to the initial condition.

It will be noticed that the release of the interponent is effected at the beginning of the stroke of the key lever, and that a second or repeat stroke of the same key can not occur until after the key lever shall have been fully retracted; that where the motor is started in action through the depression of any key, a second interponent, although freed by its key, cannot be engaged until the stroke has been completed, owing to the displacement of plate 6 and the interposition of shoulders 8 in the path of said second interponent; and, further, that the retraction of any interponent into position to engage retaining shoulder 71 only occurs after said interponent has been engaged with plate 6 and displaced thereby to present the more prominent portion of shoulder 80 in position to be engaged by rod 87 upon the enforced return of slide 35.

It will be remembered that the enforced return of slide 35 to reset a previously engaged and displaced interponent, takes place immediately after the release of valve actuating lever 28 for effecting the return or back stroke of the motor, and it is apparent that if, as might be the case, rods 87 were adjusted to lift the several interponents above their suspension shoulders or teeth 79 through engagement with the recessed or notched section 88, any interponent deposited upon the driver through the actuation of its key in the interval between the release of the first interponent and the return of slide 35 would be lifted by the latter and reëngaged with its key. Such an arrangement would introduce a limitation on the speed of the mechanism by requiring that a second key, to be effective, must be operated only after the return of slide 35; besides which the noise incident to contact of the several rods with their respective interponents at each reciprocation of slide 35 might prove objectionable. These objections are eliminated in the preferred construction illustrated wherein a slight clearance is provided between the rods 87 and their interponents when the latter are supported to present the recessed or notched portion 88 in register with said rods 87, that is to say, with the interponents either suspended upon their keys or resting upon the driver, due to their release subsequent to that of the engaged and active interponent. Under these conditions slide 35 becomes inoperative to restore and reëngage any interponent until after it shall have first been interposed between the driver and key bar and displaced laterally to present its more prominent engaging surface in position to be acted upon by rod 87 as hereinbefore explained, and in consequence should a second key be struck immediately after the first and before the driver is fully retracted, the interponent released thereby and restrained by the driver instead of being reëngaged with its key by the return of slide 35, will preserve its contact with the driver until the latter completes its return movement when it will at once be released and projected between the driver and its key bar, at the same time advancing slide 35 to start the motor and thereby complete the movement inaugurated by the depression of said second key. The special object of this arrangement is the conservation of the time. Consecutive action on the part of the keys is essential to the production of correct results in the way of succession of distinctive signals, but notwithstanding the extremely short interval occupied in completing a stroke of the motor, it is possible to depress a second key before the operation started by the prior key has been completed, and by rendering the mechanism operative to automatically produce the signal designated by such second key in the manner explained not only is the speed capacity of the mechanism as a whole increased, but the loss of signals is prevented.

It is to be noted that as arranged motor spring 77 is so arranged that the motion of the key lever for effecting the release of the interponent operates to extend and thereby augment the power of the spring in projecting the interponent, thus insuring prompt action on the part of the interponent in response to the depression of its key.

When it is desired to repeat or duplicate any given signal, lever 57 is moved to withdraw interponent 54 as hereinbefore explained, with the result that when the key lever representing the desired signal is depressed to release and project its interponent 75 the motor is started as before by the engagement of rod 87 to advance slide 35, but, owing to the absence of interponent 54, there is no longer an enforced return of slide 35, and the latter may be retained in its advanced position by the engaged interponent, thus holding latch 32 out of engagement with valve shifting lever 29 and permitting the motor to automatically continue in motion with the designated interponent 75 in engagement until by the return of interponent 54 to operative position, slide 35 is again forced back to withdraw the engaged interponent 75 as hereinbefore explained.

Although in the preferred form of embodiment illustrated herein the key bars are arranged to indirectly operate the punches through the valve bars and interponent mechanism it is apparent some or all of these intermedians may be dispensed with and the punches connected more directly with the key bars, the valve bars or their equivalents.

Having thus described our invention what we claim and desire to secure by Letters Patent of the United States, is,—

1. In a machine of the class described the combination of the following elements to-wit: a series of punch controlling valve bars; a series of key-bars; permutation devices intermediate the key-bars and valve-bars; a series of keys, one for each key-bar; a driver; a single acting motor coupled with the driver and provided with a starter; a series of interponents, one for each key, for coupling its key-bar with the driver and actuating the starter of the motor, said interponents being normally under tension to engage the driver and restrained by their respective keys; and means for positively retracting the interponent and reëngaging it during the stroke of the motor.

2. In a machine of the class described equipped with a plurality of punch controlling valve-bars, a plurality of key-bars, permutation devices for connecting each key-bar with any one or more of the valve-bars, and a plurality of keys, one for each key-bar, and in combination therewith, an actuating mechanism for the key-bars controlled by the keys, the same including a driver, a motor for said driver provided with a starter, and a plurality of interponents one for each key for effecting connection between key-bar and driver and for actuating the starter to energize the motor and reciprocate the driver and indicated key-bar.

3. In a machine of the class described provided with a plurality of individual performing members and designating keys therefor, and in combination therewith, an actuating mechanism for said performing members responsive to the keys thereof the same including a single stroke motor equipped with a starter; a driver coupled with said motor; an interponent for each performing member adapted for interposition between the latter and the driver; a motor for each interponent tending to automatically effect engagement with the driver; a tripping connection between each interponent and its key for restraining the advance of the interponent; and connections between the starter and each interponent whereby the latter, when released by its key, will operate to couple the corresponding performing member and driver and start the motor in action.

4. In a machine of the class described, the combinations of the following elements, to-wit: a series of individual performing members or key-bars; a series of keys, one for each performing member; a single stroke motor; a driver coupled with the motor; a series of interponents, one for each performing member, adapted to couple the latter with the driver and provided with an advancing motor and a tripping connection with the associated key; a starter for the driver-motor; and actuating means for said starter located in the path of each interponent and engaged by the latter in its movement toward the driver when released by its key.

5. In a machine of the class described provided with a performing member and associated designating key and in combination therewith, a motor provided with starting means; a driver coupled with said motor; an interponent for connecting the driver and performing member provided with a restraining trip connection with the key and impelling means for effecting its advance toward the driver; actuating devices for the motor starter interposed in the path of the interponent and operated by the latter when released from its key to set the motor in action; and positively acting means controlled by the motor and operating through said motor starter actuating devices to retract the interponent and effect its reëngagement with the key.

6. In a machine of the class described the combination of the following elements, to-wit: a single strike motor and associated driver and starter; a series of key-bars and complemental keys; and a series of interponents, one for each key-bar, each of said interponents engaging a key-bar and held in suspension under pressure by its key in position when released to couple its key-bar with the driver and to engage the starter for the motor.

7. In a machine such as described comprising a series of keys and complemental key-bars, a driver, and interponents controlled by the keys for coupling individual key-bars with the driver, and in combination therewith, a single stroke motor coupled with the driver and provided with a reversing valve, actuating means for said valve including a restraining latch device, tripping means for said latch, and actuating devices for said tripping means controlled by the interponents in their movements to couple the key-bars and driver.

8. In a mechanism such as described, including a driver, a plurality of key-bars and complemental keys, and interponents held under restraint by the keys and operating when released thereby to couple the key-bars and driver, and in combination therewith, a single stroke motor for said driver provided with a reversing valve and actuating devices therefor including a retaining latch, and actuating devices for said latch under the control of the interponents and operating to trip said latch during the movement of any interponent from neutral to operative position with relation to the driver.

9. In a mechanism such as described including a driver, a plurality of key-bars with complemental keys and a series of interponents, each held under restraint by a key and when released thereby advancing to couple its key-bar with the driver, and in combination therewith, a motor coupled with the driver and provided with a reversing valve, actuating devices therefor including opposed impelling members provided with restraining latches and restoring means coupled with the driver, and a tripping member for one of said restraining latches provided with actuating devices interposed in the paths of movement of the several interponents.

10. In a mechanism such as described including a driver, a plurality of key-bars with complemental keys and interponents, the latter held under restraint by the keys and each operating when released to automatically couple its key-bar with the driver, and in combination therewith, a single stroke motor for the driver, and starting means for said motor under the control of the interponents.

11. In a mechanism equipped with a driver and a plurality of key-bars each provided with a complemental key and interponent for coupling said key-bar and driver, and in combination therewith, a single stroke motor connected with the driver, and starting devices for said motor actuated by each interponent in its movement to couple the key-bar and driver.

12. In a mechanism equipped with a driver and a plurality of key-bars each provided with a complemental key and interponent for coupling the key-bar and driver, and in combination therewith, a single stroke motor provided with starting means under the control of the interponents, means for automatically stopping the motor at the end of its stroke, and controllable means for suspending the action of said stopping means and rendering the motor continuously acting.

13. In a machine such as described equipped with a driver and a plurality of key-bars each provided with a complemental key and interponent for coupling the key-bar and driver, and in combination therewith, a motor coupled with the driver and provided with reversing means including automatic means for arresting the motor upon the completion of a single stroke, starting means controlled by the interponents, and controllable means for temporarily suspending the action of the arresting means.

14. In a machine such as described equipped with a driver, and a plurality of key-bars each provided with a key and interponent, the latter held under restraint by the key and serving when released thereby to automatically couple its key-bar with the driver, and in combination therewith, a motor coupled with the driver and provided with control devices for rendering it either single stroke or continuously acting the same including means for arresting the motor at the end of each stroke, a starter under the control of the several interponents, and controllable means for suspending the action of the motor arresting devices.

15. In a machine of the class described equipped with a driver and a plurality of key-bars each provided with a key and an interponent for coupling its key-bar and driver, and in combination therewith, a prime motor connected to the driver; reversing means for said motor including a valve, opposed actuators, and retaining latches for the latter; a starter for engaging one of said retaining latches coupled with means disposed in the paths of the interponents for actuating said starter; and a supplemental motor controlled by the motion of the driver and acting upon the second retaining latch to reverse the prime motor.

16. In a machine of the class described, the combination of the following elements, to wit: a driver; a plurality of key-bars each provided with an interponent held under restraint by a key and operating when released to couple its key-bar with the driver; a prime motor for the driver provided with a reversing valve under the control of opposed actuators each adapted to be held under restraint by a latch; a starter in position to engage one of said latches and coupled with actuating devices disposed in the paths of the interponents; restoring means coupled with the driver for reëngaging the valve actuators; a tripping member for the second latch; and a supplemental motor controlled by the movement of the driver for actuating the tripping member for the second latch to effect the reversal of the prime motor.

17. In a machine of the class described, the combination of the following elements to wit: a driver; a plurality of key-bars each provided with an interponent normally held under restraint by its key and operating when released to couple its key-bar with the driver; a prime motor for the driver provided with reversing devices including two retaining latches each controlling motion in one direction; a starter for engaging one of said latches provided with actuating devices located in the paths traversed by the interponents when engaging the driver; actuating devices for the second latch; and a supplemental motor controlled by the primary motor and operating upon the actuating devices for the second latch and upon the starter to reverse the prime motor and reengage the interponent with its key.

18. In a machine of the class described, the combination of the following elements, to wit: a driver; a plurality of key-bars each provided with an interponent normally held under restraint by its key and operating when released to couple its key-bar with the driver; a prime motor for the driver provided with reversing means including two retaining latches each controlling motions in a different direction; a starter in position to engage one of said latches; actuating devices for said starter interposed in the paths of the several interponents; an actuator for the second latch; and a supplemental motor controlled by the prime motor and acting upon the starter, to forcibly retract the released interponent.

19. In a machine of the class described including a driver and a plurality of key-bars each provided with an interponent and controlling key therefor, and in combination therewith, the following elements, to-wit; a motor coupled with the driver and provided with a reversing valve mechanism subject to opposed actuators one of the latter controlled by a single latch and the other by two latches; an engaging member coupled with the driver for releasing one of the associated latches at the end of the stroke of the motor in one direction; a starter controlled by the interponents for engaging the other of said associated latches; and a supplemental motor controlled by the driver for engaging the single latch.

20. In a machine of the class described equipped with a driver, and a plurality of key bars each provided with a key and associated interponent, and in combination therewith, a motor coupled with the driver and provided with a reversing mechanism including opposed actuators, the one engaging a single and the other associated latches; an engaging member coupled with the driver for withdrawing one of the associated latches at the end of the stroke of the motor in one direction; a starter acted upon by the interponents to withdraw the other of said associated latches and thereby release their actuator to start the motor; a supplemental motor controlled through the movement of the driver and operating to release the single latch, thereby reversing the motor; and controllable connections between said supplemental motor and the starter for either positively retracting the latter, to permit reengagement of its latch at the conclusion of a single reciprocation of the prime motor or to permit said starter to be retained in its advanced or engaging position.

21. In a machine of the class described, the combination of the following elements to wit: a plurality of key-bars each equipped with a key controlled interponent; a driver; a motor for the driver provided with automatic reversing devices and means for arresting the action of the motor at the conclusion of each complete reciprocation thereof; and a starter controlled by the interponents and operating upon said arresting means to start the motor in action.

22. In a machine of the class described, the combination of the following elements, to wit: a plurality of key-bars and associated keys and interponents; a driver; a motor for the driver provided with automatic reversing means and means for suspending the action of the motor at the conclusion of each complete reciprocation of the driver; a starter controlled by the interponents for withdrawing said suspending means; and means controlled by the driver for forcibly retracting the starter.

23. In a machine such as described, the combination with a motor actuated reciprocatory driver, and a performing member and associated key, of a longitudinally and laterally movable interponent the latter temporarily held under restraint by its key and provided with a plurality of engaging surfaces of different degrees of projection; a starter for the motor provided with an actuating means standing normally opposite and in the path of movement of the lesser engaging surface of the interponent whereby upon the release of the interponent it will actuate the starter and couple the key-bar with the driver and will then be displaced laterally to present its more prominent engaging surface to the starter actuating means.

24. In a machine such as described, the combination of a motor actuated driver; a starter for the motor provided with actuating devices; means controlled by the motor for effecting an inforced return of the starter; and an interponent held under restraint by a key, and provided with two engaging surfaces of different degrees of elevation, for engaging the starter actuating devices, said interponent by a movement in one direction coupling the driver and key-bar and actuating the starter for the motor, and by the movement derived from the driver shifting the engaging surfaces of the interponent in their relation to the starter actuating devices so as to present the more prominent of said surfaces in position to be acted upon.

25. In a machine such as described, the combination of the following elements, to wit: a driver provided with a plurality of openings furnishing engaging shoulders; a motor coupled with said driver and provided with a starter; a plurality of key-bars; an interponent for each key-bar provided with two suspending shoulders or teeth, two starter engaging surfaces of different degrees of projection, and an impelling spring; a housing provided with a suspending shoulder for the interponent; and a key for each interponent provided with a displacing tooth or shoulder in proximity to the housing-suspending-shoulder, and with a sustaining shoulder or tooth for receiving the sustaining tooth of the interponent when the latter is displaced from the housing-suspending-shoulder; each of said interponents being disposed opposite an opening in the driver when the latter is in retracted position with its less pronounced surface in position to engage the starter actuating device.

26. In a machine such as described provided with a motor actuated reciprocatory driver and starting devices for the motor, and in combination therewith, a plurality of key bars; a plurality of keys, one for each key-bar; and an interponent for each key and associated key-bar adapted for interposition between the driver and key-bar and for engagement with the starting devices, said interponents normally engaging their respective key-bars and held under restraint by a tripping connection with the keys.

27. In a machine such as described, the combination of the following elements, to wit: a reciprocatory driver; a key-bar; an interponent normally engaging the key-bar and movable in two directions, to engage the driver and accompany the key bar when coupled therewith; a pivoted key provided with a tooth for engaging a shoulder or tooth on the interponent; a movable strut engaging the key-lever; and a spring interposed between said strut and the interponent and operating to both impel the interponent and advance the key lever into engagement therewith.

28. In a machine such as described, the combination of the following elements, to wit: a driver; motor devices for reciprocating the driver provided with starting means; a plurality of independently movable key-bars; a key lever for each key-bar; and an interponent for each key-bar movable toward and from the driver and with the key-bar, said interponent being provided with means for detachably suspending it upon the key-lever and with two engaging surfaces of different degrees of projection in the direction of motion toward the driver to couple the latter with the key-bar, the lesser of said engaging surfaces standing normally in register with the starting means; and means for positively retracting the starting devices.

29. In a machine such as described provided with a driver, motor devices for reciprocating the driver including a starter and actuating means therefor, and a plurality of key-bars, and in combination therewith the following elements, to wit: a plurality of interponents, one for each key-bar, adapted for interposition between the driver and the associated key-bar and to partake of the movement of the latter when coupled with the driver, each of said interponents provided with two surfaces of different degrees of projection for alternately engaging the actuating means for the starter and with sustaining and suspending teeth;

a key lever for each interponent provided with displacing and sustaining teeth or projections; and a fixed sustaining shoulder for each interponent.

30. In a machine such as described provided with a driver, a motor connected therewith and starting devices for the motor, and in combination therewith, a plurality of key-bars; an interponent for each key-bar normally engaging the latter and adapted to be interposed between it and the driver, said interponent being equipped with two suspension teeth or projections and with two engaging surfaces at different levels whereof the more remote surface is normally presented in position to engage the motor starting devices and is removed therefrom and the other surface presented to said starting devices when the interponent is shifted laterally by the driver; a fixed sustaining shoulder adjacent each interponent in position to receive one of the suspension teeth of said interponent when the latter is fully retracted through the medium of the motor starting devices upon the return movement of the latter; and a pivoted key lever for each key-bar provided with two teeth or projections, the one operating upon the interponent to displace the latter from the fixed sustaining shoulder and the other to engage and sustain the interponent until withdrawn therefrom.

31. In a machine such as described provided with a driver, a motor and starting devices for the latter, and in combination therewith, the following elements, to wit: a plurality of key-bars adjacent the driver; a movable interponent for each key-bar normally engaging the latter and adapted to be advanced between the driver and key-bar to transmit motion to the latter, said interponent being provided with a plurality of suspension teeth and two starting device engaging surfaces of different degrees of projection; a fixed sustaining shoulder for each interponent; a pivoted key-lever for each interponent provided with displacing and suspending teeth, and a spring connecting each interponent and its associated key lever in a manner to simultaneously advance the interponent and retract the associated key lever.

JOHN SELLERS BANCROFT.
MAURITZ C. INDAHL.

Witnesses:
MORTIMER A. JONES,
SAMUEL R. DAVIS.